(12) United States Patent
King

(10) Patent No.: US 6,899,404 B1
(45) Date of Patent: May 31, 2005

(54) CABINET SYSTEM

(76) Inventor: Ron E. King, 9290 Beatty Dr., Sacramento, CA (US) 95826

( * ) Notice: Subject to any disclaimer, the term of this patent is extended or adjusted under 35 U.S.C. 154(b) by 0 days.

(21) Appl. No.: 10/462,247

(22) Filed: Jun. 16, 2003

(51) Int. Cl.⁷ ............................................. F16B 12/00
(52) U.S. Cl. ................................................... 312/111
(58) Field of Search .................... 312/111, 140, 257.1, 312/265.6, 198, 199, 107, 108, 140.4; 52/459, 52/461, 464, 470

(56) References Cited

U.S. PATENT DOCUMENTS

| | | | | |
|---|---|---|---|---|
| 2,599,322 A | * | 6/1952 | Drain | ........................... 52/278 |
| 2,708,292 A | * | 5/1955 | Budai | ........................... 52/474 |
| 2,824,775 A | * | 2/1958 | Sitler | ........................... 312/111 |
| 3,351,400 A | * | 11/1967 | Sholtes | ........................ 312/111 |
| 3,814,489 A | * | 6/1974 | Clark et al. | .................. 428/357 |
| 4,123,129 A | * | 10/1978 | Butler | ...................... 312/265.3 |
| 5,350,227 A | * | 9/1994 | Katz | ........................... 312/198 |
| 6,312,068 B1 | * | 11/2001 | Benner et al. | .............. 312/111 |

FOREIGN PATENT DOCUMENTS

EP 483589 * 5/1992

* cited by examiner

*Primary Examiner*—James O. Hansen
(74) *Attorney, Agent, or Firm*—Thomas R. Lampe

(57) ABSTRACT

A cabinet system includes a connector in a gap between two cabinets. The connector includes lock elements positioned in slots formed in the cabinets, a cover member covering the gap and a spacer engaging side walls of the cabinets.

10 Claims, 4 Drawing Sheets

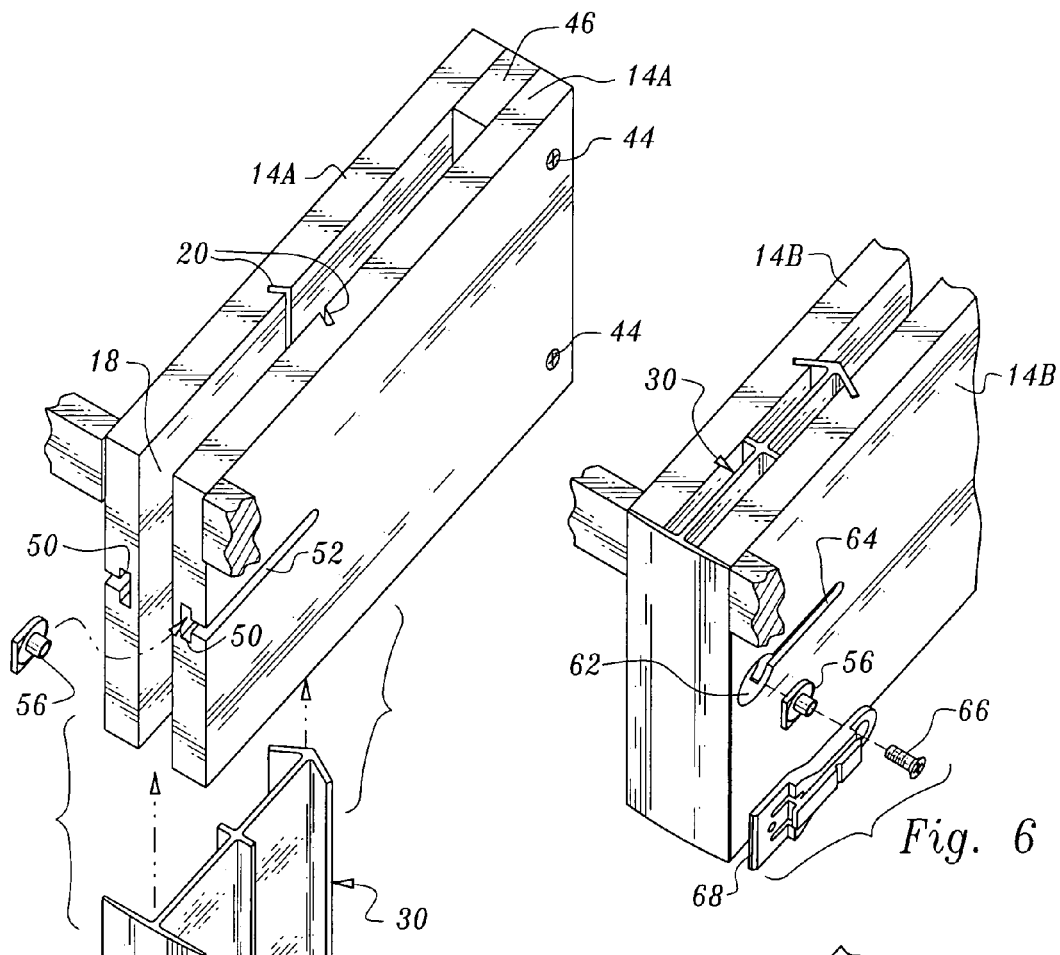
Fig. 4
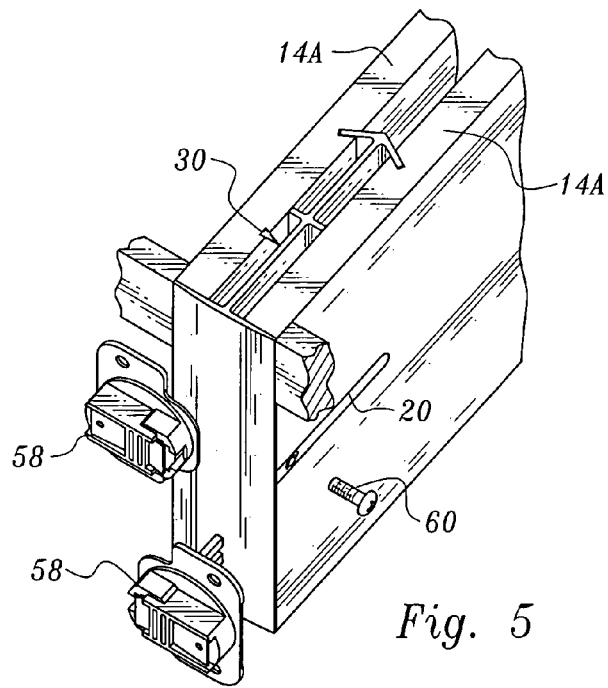
Fig. 5
Fig. 6

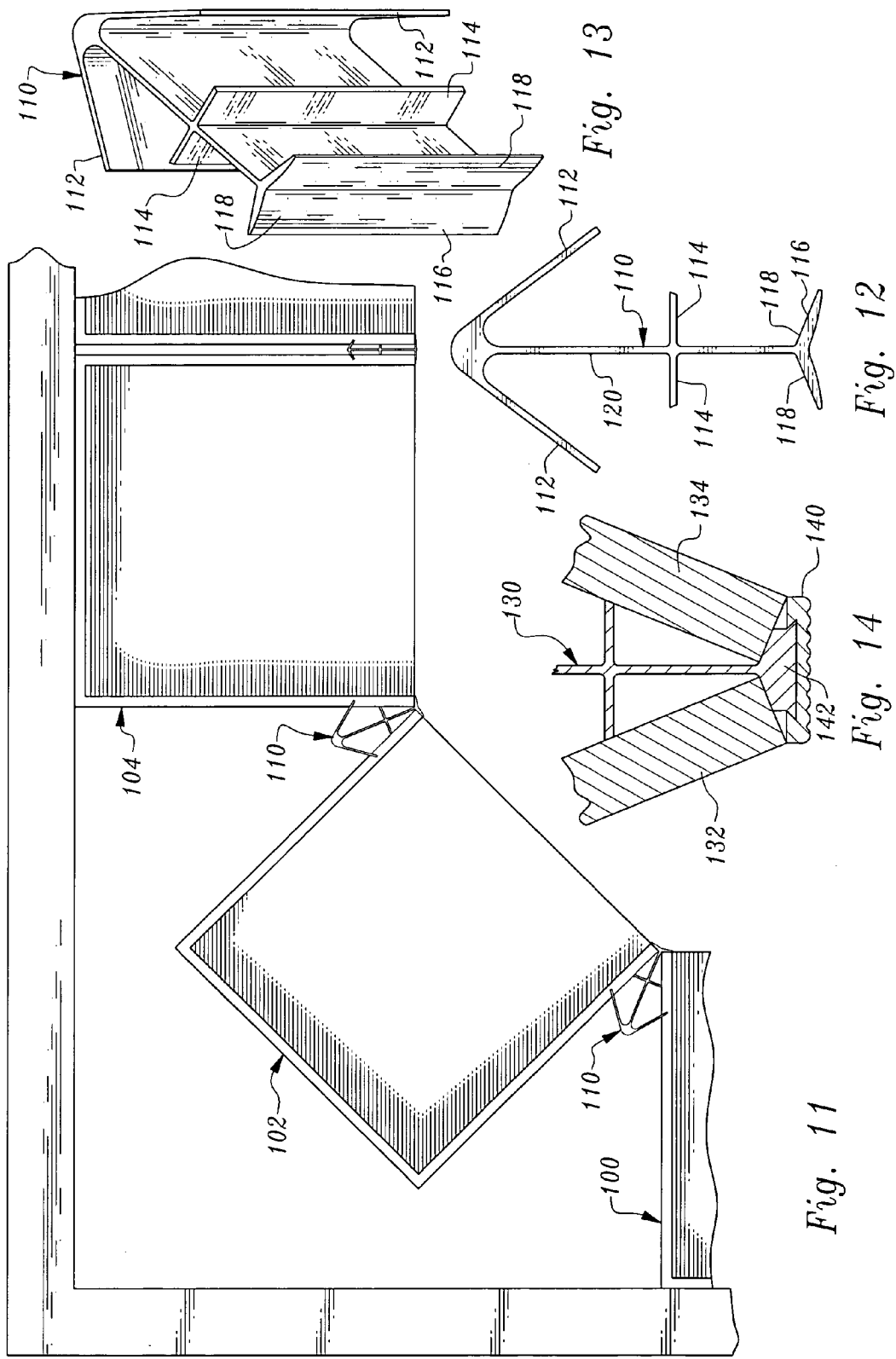

CABINET SYSTEM

TECHNICAL FIELD

This invention relates to a cabinet system, more particularly, a cabinet system including individual storage cabinets and a connector releasably connecting the individual cabinets.

BACKGROUND OF THE INVENTION

It is well known to attach individual storage cabinets together at the side walls thereof to provide a rigid overall system structure. Typically this is accomplished by bringing the side walls of adjacent cabinets into abutting relationship and then inserting screws or possibly other threaded fasteners through and/or into the abutting side walls.

This prior art approach can present an unsightly appearance unless molding, facing strips or the like are applied to the cabinets so that the line of cabinet juncture is covered.

Thin-walled cabinets present their own special difficulties since the two abutting thin cabinet side walls, when viewed from the front of the cabinet, present a rather insubstantial appearance and provide the perception that the cabinet system are not sturdy or strong.

In addition, employing screws to provide the interconnection between the cabinet side walls takes time and effort. Where installation is performed by professionals, this results in added project costs. Thin side walls make the screws somewhat ineffectual since they can pull out of the wall relatively readily.

With regard to the face plates, laminates, etc. employed at the front of the cabinets at the location of the abutting cabinet side walls, these components are normally permanently installed and are not readily removable or replacable to provide a different cabinet system appearance if desired.

DISCLOSURE OF INVENTION

The present invention relates to a cabinet system wherein the side walls of adjacent cabinets define a gap therebetween. No screws or other types of threaded fasteners need be employed to connect the cabinet side walls.

A connector of a unique character is disposed in the gap between the cabinet side walls and is employed to both interconnect the cabinets and maintain the gap therebetween.

The connector also serves to present a pleasing cabinet appearance when the connected cabinets are observed from the front and leaves the observer with the impression of strength, sturdiness and stability, even when thin, walled materials are employed in the construction of the cabinet side walls. The gap is covered by a cover member of the connector and the appearance and styling of the cabinets at their location of interconnection can be readily changed by replacing the connector with another having a different type of cover member.

Other features, advantages and objects of the present invention will become apparent with reference to the following description and accompanying drawings.

BRIEF DESCRIPTION OF DRAWINGS

FIG. 4 is an exploded, perspective view illustrating the connector in the process of being installed between two cabinet side walls, the cabinet side walls defining slots for receiving components of a cabinet door hinge fastener, one of the fastener components shown just prior to installation;

FIG. 5 illustrates the arrangement shown in FIG. 4 with the connector and the hinge fastener component installed, hinge components shown prior to installation;

FIG. 6 is a view similar to FIG. 5, but showing a different embodiment of cabinet door hinge components prior to installation;

FIG. 11 is a top, plan view of a cabinet system employing two different embodiments of connector;

FIG. 12 is a top, plan view of one of the connector embodiments utilized in the arrangement of FIG. 11;

FIG. 13 is a perspective view of the connector of FIG. 12; and

FIG. 14 is an enlarged, cross-sectional, top, plan view illustrating two angled cabinet walls forming a gap and cooperating with yet another embodiment of connector employed to maintain the gap and interconnect the cabinet walls.

MODES FOR CARRYING OUT THE INVENTION

Figure 1:
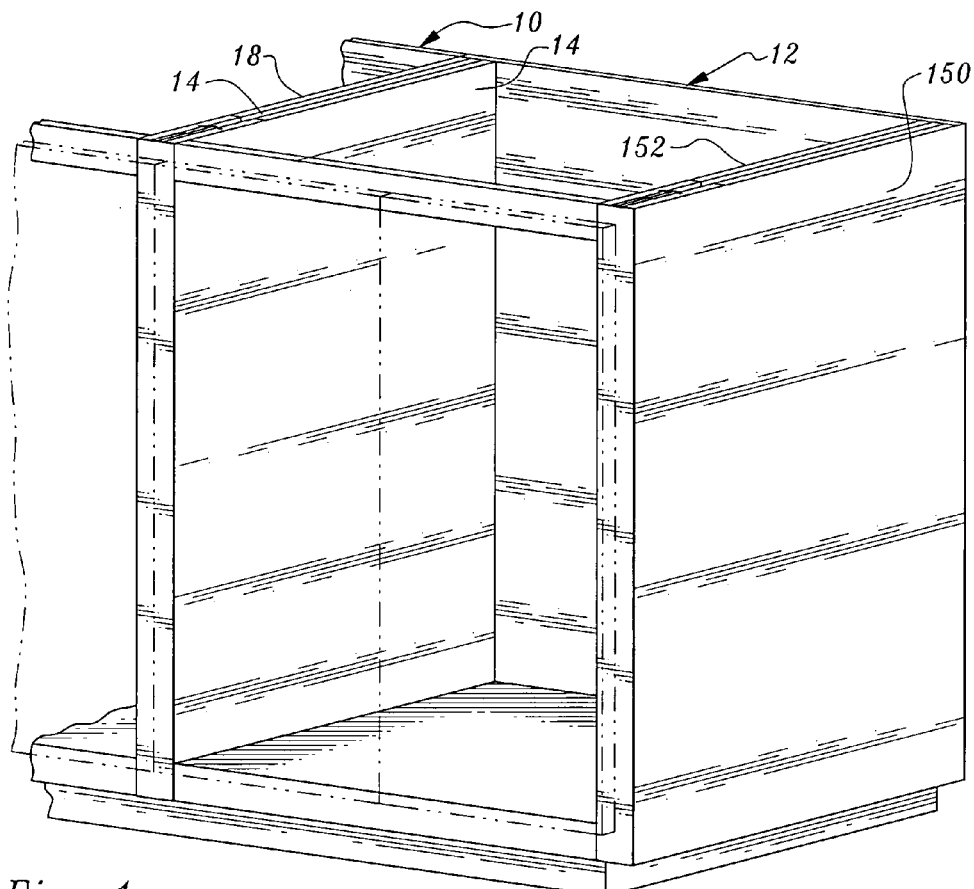
FIG. 1 is a perspective view illustrating a cabinet system constructed in accordance with the teachings of the present invention and including two interconnected cabinets, one of which is only partially shown.
Figure 3:
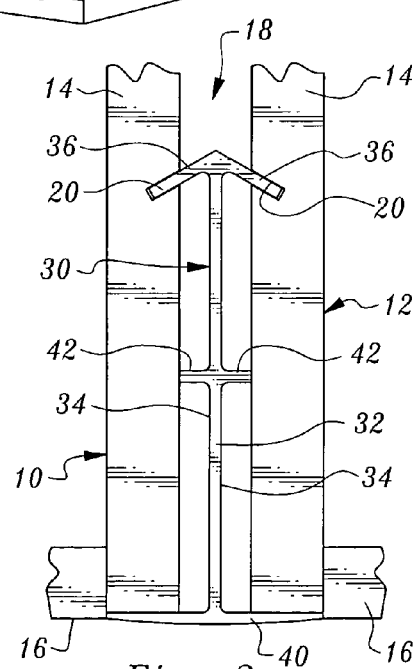
FIG. 3 is a top, plan view showing the connector installed in a gap between two cabinet side walls.

FIG. 1 illustrates a segment of a cabinet system including two cabinets 10 and 12 disposed side by side. As may best be seen with reference to FIG. 3, each of the cabinets includes a cabinet side wall 14 and a cabinet front 16, as is conventional.

The side walls 14 are parallel and define a gap 18 therebetween.

Slots 20 are formed in the side walls 14. The slots are positioned inwardly of the cabinet fronts and spaced therefrom. Slots 20 are angularly disposed relative to the cabinet fronts and angularly disposed relative to one another, as shown. The slots communicate with gap 18.

Figure 2:
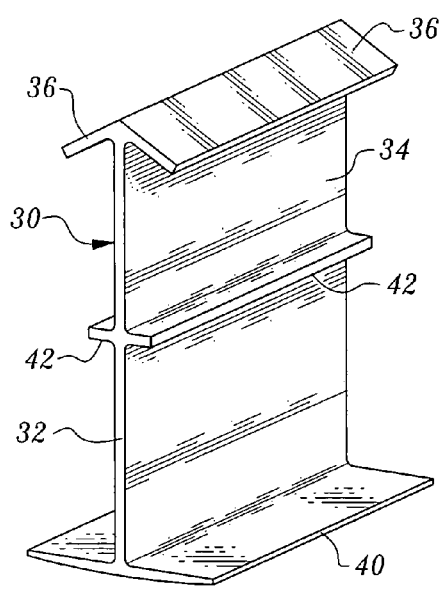
FIG. 2 is a greatly enlarged, perspective view of a connector constructed in accordance with the teachings of the present invention.

A connector 30 (also shown in FIG. 2) is in the gap 18. The connector is disposed between the cabinets 10, 12 and interconnects the cabinets. The connector engages the side walls 14 to maintain the gap 28 therebetween.

The connector 30 is of integral construction, being formed of any suitable material. The connector lends itself, for example, to formation by plastic extrusion or molding processes.

The connector includes a double-ended central connector portion 32 having opposed sides 34.

Lock elements 36 project outwardly from the central connector portion at one end of the connector. The lock elements are angled with respect to one another and with respect to the central connector portion. The lock elements 36 substantially conform to the configuration of slots 20 formed in side walls 14. The lock elements are positioned in the slots, engaging the cabinet side walls. The slots serve to maintain the gap by preventing movement of the side walls toward or away from one another. The slots 20 extend from either or both of the upper ends of the side walls so that the connector may readily be slid into position.

A cover member 40 is located at the end of the central connector portion spaced from lock elements 36. The cover member is disposed externally of and in engagement with the cabinet fronts 16 to cover the gap 18 and also the front ends of side walls 14. This not only presents a pleasing appearance but also one which gives the impression of sturdiness, strength and stability, even if the side walls are formed of thin-walled composite material, e.g. one-half inch particle board or fiber board. The connector also cooperates with the cabinets in such a manner as to actually enhance the strength, stability and sturdiness of the cabinet system and not just provide the appearance of doing so.

The slots 20 and lock elements 36 extend vertically along imaginary intersecting planes forming an acute angle, the slots and lock elements extending generally in the direction of the cabinet fronts and the cover member 40. Once in slots 20, the lock elements cannot be inadvertently dislodged therefrom, at least partially due to the fact that cover member 40 is in engagement with the cabinet fronts.

The connector 30 also includes spacer members or projections 22 which project away from one another and from the central connector portion 32. The distal ends of the spacers 42 are spaced apart the distance of gap 18 and engage the side walls 14. This further adds to the strength and stability of the installation and contributes to maintenance of the gap.

It will be appreciated that the connector may be slid vertically, if desired, out of engagement with the cabinets and replaced, with another connector, for example one having a different shaped cover member to alter the appearance of the cabinet system. FIGS. 4 and 5 illustrate the connector 30 being utilized with two cabinet side walls 14A having slots 20 formed therein and defining a gap 18. In this arrangement, the rear ends of the side walls 14A are secured by screws 44 to a spacer panel 46, only the front end of the cabinets being held together by the connector 30. However, it will be appreciated that connectors 30 may also be employed at both the rear and front ends of the cabinet, if desired.

In the arrangement of FIGS. 4 and 5, T-shaped openings 50 communicating with slots or slits 52 are formed in the side walls 14A, in the manner disclosed in my U.S. Pat. No. 6,314,616, issued Nov. 13, 2001, and allow the use of fastener structure including component 56 shown in that patent to fasten cabinet door hinge structure to be applied to the side walls. In FIG. 5 conventional door hinge elements are designated by reference numeral 58 and shown just prior to connection to their respective side walls 14A.

Fastener component 56 may be positioned in place prior to installation of connector 30 and the door hinge structures 58 may be attached to fastener component 56 by a screw 60 after the connector is in place.

FIG. 6 shows a somewhat similar arrangement wherein side walls 14B have round apertures 62 and slots or slits 64 formed therein (only one such combination being illustrated). Such an arrangement is disclosed in my U.S. Pat. No. 6,353,966, issued Mar. 12, 2002. After fastener component 56 is introduced through aperture 62 and slid in place behind slit 64, a screw 66 may be utilized to affix door hinge structure 68.

Figure 7:
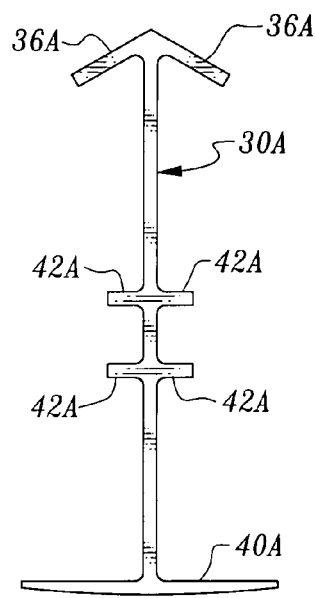
FIG. 7 is a top, plan view of a second embodiment of connector.

FIG. 7 illustrates a second connector embodiment 30A. In this embodiment there are two sets of spacer members or projections 42A disposed between the cover member 40A and the lock elements 36A.

Figure 8:
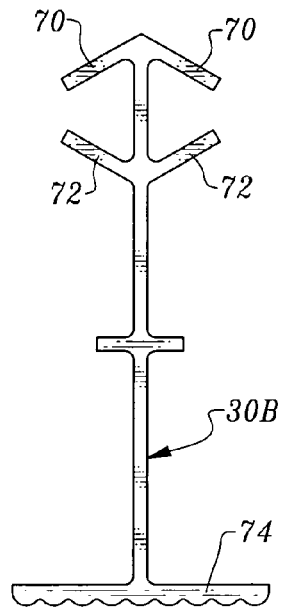
FIG. 8 is a top, plan view of a third embodiment of connector.

FIG. 8 shows a third embodiment of the connector, connector 30B, wherein two pairs of lock elements 70, 72 are employed, the lock elements of each pair being angled in the general direction of the lock elements of the other pair. Also, in the FIG. 8 embodiment, the cover member 74 has a different configuration than that of FIG. 7.

Figure 9:
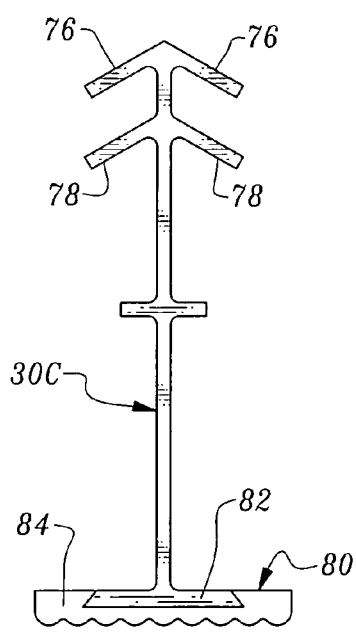
FIG. 9 is a top, plan view of a fourth embodiment of connector.

FIG. 9 discloses an embodiment 30C of the connector wherein two sets of lock elements 76, 78 are also employed. However, in this instance the lock elements are all angled in the same direction, generally toward the cover member 80 of the connector 30C. Cover member 80 includes an inner cover member element 82 and an outer cover member element 84. The outer cover member element 84 is releasably connected to the inner cover member element 82, in particular by cooperable dovetail tenon and mortise structure. This allows the outer cover member element to be slid on or off the inner cover member element 82 when desired, for example to replace the outer cover member element with one having a different configuration, color, etc. Frictional engagement between the inner and outer cover member elements maintains them against relative movement until adequate forces are exerted on the outer cover member element to move it relative to the inner cover member element.

Figure 10:
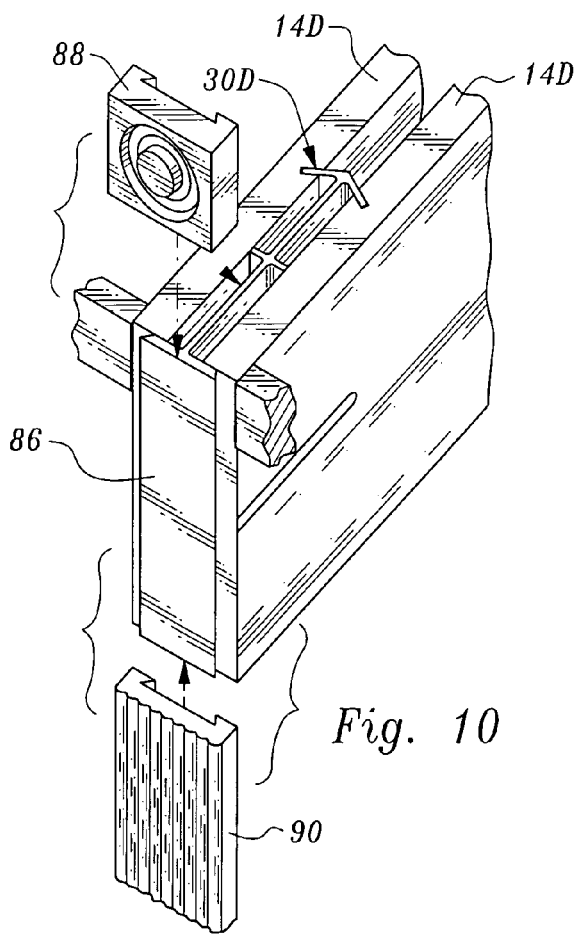
FIG. 10 is an exploded, perspective view illustrating a fifth connector embodiment installed in place between two cabinet walls and incorporating a multi-component cover member, two outer cover member components being shown positioned prior to assembly.

FIG. 10 shows another form of connector 30D positioned in a gap between cabinet side walls 14D. In this embodiment the connector is the same as that shown in FIGS. 1–6 except that the cover member is of multi-part construction, the inner cover member element 86 being in the form of a dovetail tenon. Dovetail mortises are formed in two outer cover member elements 88, 90 allowing them both to be slid on to or off of inner cover member element 86, as desired.

FIG. 11 provides an illustration of a cabinet system located at a room corner and including cabinets 100, 102, 104 angularly disposed relative to one another and defining wedge-shaped gaps therebetween. FIGS. 12 and 13 illustrate a connector 110 employed in the gap between cabinets 100 and 102 and the gap between cabinets 102, 104.

Connector 110 includes lock elements 112 which are more elongated than the previously described and illustrated connectors. Spacer members 114 are also longer than those of the previously described connectors.

The connector 110 also features a cover member 116 which has angularly disposed segments 118. Cover member segments 118 define an acute angle where they meet the central connector portion 120 of the connector 110 to conform to the angle formed by the forward ends of the side walls of adjoining cabinets 100, 102 and cabinets 102, 104.

FIG. 14 illustrates a portion of a connector embodiment 130 which is also positioned in a wedge-shaped gap defined by side walls of two angularly disposed cabinets 132, 134. In this arrangement, the cover member 140 includes an inner cover member element 142 and an outer cover member element 144 releasably connected thereto by a dovetail tenon and mortise arrangement.

A connector of a type disclosed herein can be utilized to connect a cabinet side wall to a cabinet component other than the side wall of another complete cabinet. For example, in FIG. 1 a supplemental outer cabinet side wall 150 is shown connected to an inner side wall 152 of cabinet 12. This may, for example, be desired for decorative purposes.

What is claimed is:

1. A cabinet system comprising, in combination:
   a first cabinet including a first cabinet side wall;
   a second cabinet including a second cabinet side wall, said first cabinet and said second cabinet being spaced from one another and said first cabinet side wall and said second cabinet side wall defining a gap therebetween; and
   a connector in said gap disposed between said first cabinet and said second cabinet interconnecting said first cabinet and said second cabinet and engaging said first cabinet side wall and said second cabinet side wall, said first cabinet side wall and said second cabinet side wall defining slots and said connector including a central connector portion and lock elements projecting outwardly from opposed sides of said central connector portion and positioned in said slots, said first cabinet and said second cabinet having cabinet fronts, said slots positioned inwardly of said cabinet fronts and spaced therefrom, said slots being angularly disposed relative to said cabinet fronts and angularly disposed relative to one another, said connector further including a cover member spaced from said lock elements at least partially covering said gap and in engagement with said cabinet fronts, said slots and said lock elements extending vertically along intersecting planes forming an acute angle.

2. The combination according to claim 1 wherein said connector further includes at least one spacer member engaging said first cabinet side wall and said second cabinet side wall to maintain the gap therebetween.

3. The combination according to claim 1 wherein said connector is of integral construction.

4. The combination according to claim 1 wherein said central connector portion has two central connector portion ends and wherein said lock elements are positioned at one of said central connector portion ends and extend generally toward said cabinet fronts.

5. The combination according to claim 4 wherein said cover member is located at the other of the two central connector portion ends.

6. The combination according to claim 1 wherein said cover member includes an inner cover member element and an outer cover member element releasably connected to said inner cover member element.

7. The combination according to claim 6 wherein said inner cover member element and said outer cover member element are releasably connected by cooperable dovetail tenon and mortise structure.

8. A cabinet system comprising, in combination:
   a first cabinet including a first cabinet side wall;
   a second cabinet including a second cabinet side wall, said first cabinet and said second cabinet being spaced from one another and said first cabinet side wall and said second cabinet side wall defining a gap there between; and
   a connector in said gap disposed between said first cabinet and said second cabinet interconnecting said first cabinet and said second cabinet and engaging said first cabinet side wall and said second cabinet side wall, said first cabinet side wall and said second cabinet side wall defining slots and said connector including a central connector portion and lock elements projecting outwardly from opposed sides of said central connector portion and positioned in said slots, said first cabinet and said second cabinet having cabinet fronts, said slots positioned inwardly of said cabinet fronts and spaced therefrom, said slots being angularly disposed relative to said cabinet fronts and angularly disposed relative to one another, said connector further including a cover member spaced from said lock elements at least partially covering said gap and in engagement with said cabinet fronts and at least one spacer member engaging said first cabinet side wall and said second cabinet side wall to maintain the gap therebetween.

9. The combination according to claim 8 wherein said at least one spacer member includes a pair of spacer projections projecting outwardly from opposed sides of said cabinet connector portion.

10. The combination according to claim 8 wherein said at least one spacer member is located between said cover member and said lock elements.

* * * * *